No. 824,895. PATENTED JULY 3, 1906.
F. P. WHITE.
VEHICLE SHAFT BRACE.
APPLICATION FILED AUG. 25, 1905.
2 SHEETS—SHEET 2.
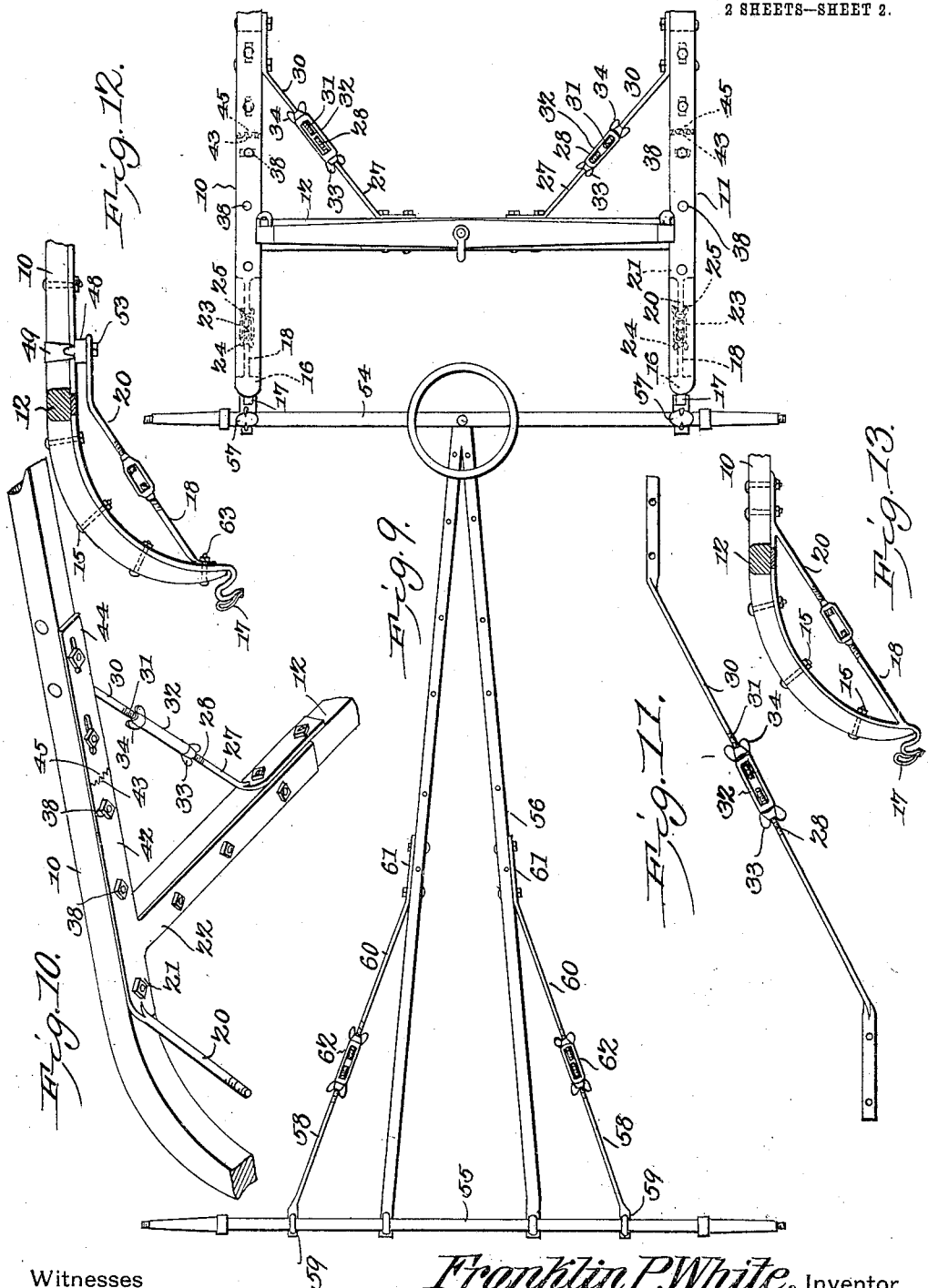
Witnesses
E. H. Stewart
C. N. Woodward
Franklin P. White, Inventor
by Chow & Co
Attorneys

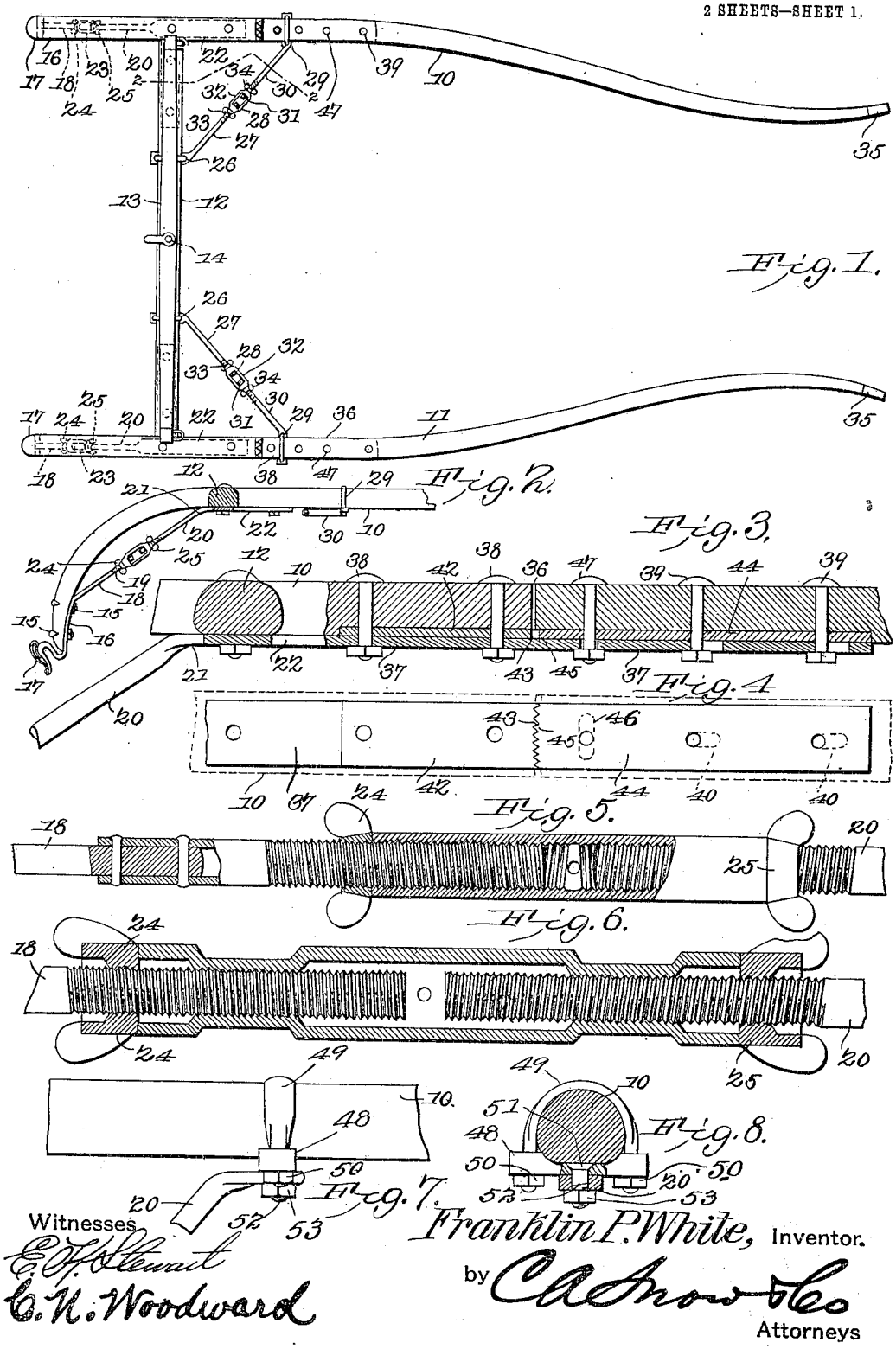

UNITED STATES PATENT OFFICE.

FRANKLIN P. WHITE, OF SHALLOTTE, NORTH CAROLINA.

VEHICLE-SHAFT BRACE.

No. 824,895.  Specification of Letters Patent.  Patented July 3, 1906.

Application filed August 25, 1905. Serial No. 275,827.

*To all whom it may concern:*

Be it known that I, FRANKLIN P. WHITE, a citizen of the United States, residing at Shallotte, in the county of Brunswick and State of North Carolina, have invented a new and useful Vehicle-Shaft Brace, of which the following is a specification.

This invention relates to the running-gear of vehicles, and has for its object to produce simply-constructed attachments for the same whereby the parts may be maintained in proper relative position to cause the wheels to travel in alinement and to correct any irregularities or want of uniformity in the "draft."

With these and other objects in view, which will appear as the nature of the invention is better understood, the same consists in certain novel features of construction, as hereinafter fully described and claimed.

In the accompanying drawings, forming a part of this specification and in which corresponding parts are denoted by like designating characters, is illustrated the preferred form of the embodiment of the invention capable of carrying the same into practical operation.

In the drawings, Figure 1 is a plan view of a pair of vehicle-shafts with the improvement applied. Fig. 2 is a detail in section on the line 2 2 of Fig. 1. Fig. 3 is an enlarged sectional detail of a portion of one of the thills illustrating the construction of one of the adjustments. Fig. 4 is a plan view of portions of the structure shown in Fig. 3. Figs. 5 and 6 are modified constructions of the turnbuckle portions of the device. Fig. 7 is a side view, and Fig. 8 is a sectional view of an approved form of clip adapted for coupling the device to the shafts and other parts. Fig. 9 is a plan view of portions of the running-gear of a vehicle with the improved attachments applied. Fig. 10 is an enlarged perspective view from beneath of a portion of one of the thills and the cross-bar with the improvement applied in a modified form. Fig. 11 is an enlarged view of one of the attachments illustrating another modified form of the same. Figs. 12 and 13 are views similar to Fig. 2, illustrating still other modifications in the construction.

In the operation of vehicles the running-gear is frequently discovered to be out of adjustment and causing the wheels to run out of alinement, and in a large number of cases this eccentricity of movement is caused by discrepancy in the adjustment or relative position between the thills or shafts and the forward axle and also between the longitudinal and transverse members of the running-gear 4, and if means are provided for adjusting the parts and correcting these discrepancies the draft will be uniform and the wheels caused to run true or "track."

The device herein described is designed to correct the irregularities above referred to both in the thills or shafts and also in the other parts, and thus correspondingly correct the eccentric movement of the wheels.

The improved device may be applied to any of the various makes of thills or shafts or running-gear employed upon vehicles of various forms and sizes, but for the purpose of illustration is shown applied to a conventional structure of this class, the thills being represented at 10 11 with the connecting cross-bar at 12, the whiffletree (represented at 13) being pivoted at 14 to the cross-bar.

The forward axle is represented at 54, the rear axle at 55, and the connecting "reach" members at 56.

The portions of the device attached to the thills will first be described and are arranged as follows: Attached, as by bolts 15, to the rear ends of the thills 10 11 are bars 16, extended at one end into clip members 17 for engaging the coupling members 57 upon the forward axle. The bars 16 are extended at their forward ends into rods 18, having threaded terminals, as at 19. Other rods 20 are coupled at one end, as at 21, to the thills or shafts 10 11, preferably integral with the T-plates 22, whereby the members 10 11 and the cross-bar 12 are supported and braced, with the free ends of the rods 20 threaded reversely to the threads of the rods 18, so that turnbuckle members 23 may be employed to couple the rods, as shown, and thus strain the rods longitudinally. Jam-nuts 24 25 will preferably be employed upon the rods 18 and 20 for bearing against the opposite ends of the turnbuckle member 23 and obviate any tendency of the parts to work loose under the jar or concussions to which they are subjected when in use. By this means the curved rear portions of the thills or shafts are supported and braced and may be adjusted to any required extent to correct any discrepancy in their relative positions, as hereinafter explained. Connected by clips 26 or other suitable means to the cross-bar 12 are rods 27, spaced apart at equal distances from the thills or shafts 10 11 and with threaded terminals 28, and similarly secured, as by clips 29, to the thills 10 and 11 are rods 30, having threaded terminals 31, the threads of the rods 30 being reversed to the threads of the rods 27 and the clips 29 being spaced from the bar 12. Turnbuckle members 32 are engaged with the threaded ends of the rods 27 30, as shown, and jam-nuts 33 34 are also preferably employed upon the rods for bearing upon the turnbuckles to "lock" the same and prevent accidental displacement under the jars and strains to which the vehicle is subjected. By this means the rotation of the turnbuckles 32 will cause the rods 27 30 to exert a strain upon the thills or shafts and adjust the free ends 35 of the same laterally to any required extent, to correct any discrepancy which may exist between the thills or shaft and forward axle and restore them to their proper coactive relations.

In Figs. 1, 2, and 3 the thills 10 11 are in two sections, divided at 36 with coupling-plates 37, extending beneath the sections and bolted, as at 38 39, respectively, to the sections, the bolts 39 operating in slots 40, extending longitudinally of the coupling-plate, so that the forward shaft-section may be moved away from or toward the rear shaft-section. Attached to the rear shaft-section between the same and the coupling-plate 37 is a lock-plate 42, preferably secured in position by the same bolts 38 which secure the coupling-plate in position and provided with serrations or teeth 43, as shown in Fig. 4. Attached to the forward shaft-section and between the same and the plate 37 and preferably held in place by the same bolts 39 which secure the coupling-plate, is another lock-plate 44, having serrated teeth 45 for engaging with the teeth 43 of the plate 42. The plate 44 is also provided with a transverse slot 46, through which a bolt 47 passes, and likewise through the plate 37 and thill or shaft member above the same. By this arrangement it will be obvious that when the bolt 47 is removed and the bolts 39 relaxed the forward sections of the thills or shafts may be drawn forward until the teeth 43 45 are released, when the forward section of the thill may be moved laterally by pressure exerted upon the forward end 35, deflecting the plate 37 to an extent sufficient to enable the teeth of the plate 44 to come opposite another set of the teeth of the plate 42. The plate 44 is then moved toward the plate 42 to reëngage the teeth and the clamp-bolt 47 restored, the slot 46 permitting the bolt to be thus restored to its position. The relatively long thills enable a very strong leverage power to be applied to the comparatively small binding-plate 37 to deflect the same laterally to an extent sufficient to secure the required adjustments. This lateral adjustment may also be partly accomplished by operating the turnbuckles 32. By this means the thills may be adjusted to bring them into proper position relative to the axles and other parts of the running-gear and cause the wheels to track properly. The lateral adjustment of the thills also enables them to be adapted to horses of various sizes, as will be obvious.

If preferred, the tubular form of turnbuckle may be employed, as shown in Figs. 5 and 6, instead of the open form shown in Figs. 1 and 2, the tubular form being preferable for finer carriages and buggies and similar vehicles.

In Figs. 7 and 8 a modified form of the clip member is shown, whereby the rods are coupled to the thills or shaft and to the bar 12, consisting in a bar 48, coupled to the thill or bar by a U-shaped member 49 and nuts 50, the bar having a countersunk aperture in which the countersunk head 51 of a bolt 52 bears, the bolt provided with a nut 53 and adapted to support the rods in position, as shown. The clip member thus described may be employed when the rods 20 are applied to thills or shafts already in use or when it is not desired to employ an extension of the T brace or plate 22.

In Figs. 9 and 10 the thill members 10 11 are shown without the division 36 and dependent upon the bending of the body of the thill members by the force exerted by the straining of the rods 27 30 to accomplish the desired results. In the modified construction shown in Figs. 9 and 10 the plate 37 is dispensed with and the plates 42 44 only employed. The same device is applicable between the rear axle 55 and the reach or coupling-frame structure 56, as shown in Fig. 9, wherein rods 58, corresponding to the rods 27, are coupled to the rear axle 55, as by clips 59, and rods 60, corresponding to the rods 30, are coupled to the reach member 56, as at 61, the adjacent ends of the rods being reversely threaded and connected adjustably by turnbuckles 62, corresponding to the turnbuckles 32. By this arrangement it is obvious that any discrepancy between the axle 55 and the remainder of the running-gear may be very easily corrected.

In Fig. 11 another slightly-modified form of the construction is shown wherein the outer ends of the threaded rods are turned at right angles to the same when employed in the form of structure shown in Figs. 1 and 2, the form shown in Fig. 11 being applicable to some forms of vehicle running-gear.

In Fig. 12 the member 18 is shown bolted, as at 63, to the ordinary straps or "irons" upon the under side of the curved portion of the thill, while the member 20 is coupled to the thill in advance of the cross-bar 12 by a suitable clip, for instance, of the form shown in Figs. 7 and 8. This construction will be employed when the device is to be applied to vehicles already constructed.

In Fig. 13 the members 18 and 20 are shown formed integral with the usual straps or irons employed upon the curved portions of the thills, this form of the structure being preferable upon some constructions of vehicles.

The diagonal braces having the turn-buckles embodied therein are rigidly connected at the ends to the main members of the running-gear—for instance, to the thills 10 11 and the cross-bar 12 and to the rear axle 55 and reach 56—so that the adjustments are secured only by deflecting the rigidly-connected parts and not by moving the same upon hinged joints or the like. The rigidity of the union between the parts thus remains undisturbed, no matter to how great an extent the parts may be adjusted.

It will be observed that the lateral deflection of the thills and other parts will be very slight to accomplish the desired results, so that no danger exists of the fracture of the parts while making the same.

Having thus described the invention, what is claimed is—

1. A vehicle running-gear having transverse members and longitudinally-disposed members rigidly united, in combination with rods connected respectively to said members and extending diagonally between them, and means for adjustably uniting the adjacent ends of said rods for imparting a longitudinal strain thereto, and changing the angularity between said members.

2. A vehicle running-gear having transverse members and longitudinal members rigidly united in combination with rods connected at one end respectively to said members and extending diagonally therefrom with the free ends reversely threaded, and turnbuckles engaging said threaded ends.

3. The combination with the shafts of a vehicle having a cross-bar connected rigidly laterally of the same, of rods coupled at the ends to said shafts and cross-bar and spaced from the juncture thereof, and means for adjusting said rods longitudinally.

4. The combination with the shafts of a vehicle having a cross-bar connected rigidly laterally of the same, of rods coupled at the ends to said shafts and cross-bar and spaced from the juncture thereof and turnbuckles operating upon said rods.

5. The combination with the shafts of a vehicle and the cross-bar connecting the same, of braces connected to the shafts and having at one end means for connecting to the axle-clip, and extended at the other ends into rods provided with threaded terminals, rods coupled at one end to the shafts adjacent to the cross-bar and with the other ends threaded reversely to the first-mentioned rods, and turnbuckles engaging said threaded ends.

6. A vehicle-shaft divided transversely, a coupling-plate extending over the adjacent ends of the divided portions and connected thereto, one of the shaft portions adjustable longitudinally relative to said coupling-plate and swinging laterally thereover, adjusting-plates connected respectively to the divided ends of said shaft member and provided with intersecting teeth in their adjacent ends, and means for clamping said swinging shaft-section in any required position.

7. The shafts of a vehicle having a cross-bar disposed laterally of the same and divided transversely in advance of the cross-bar and with the forward portions swinging laterally relative to the rear portions, rods coupled at the ends to said cross-bar and the rear portion of said shafts and spaced from the juncture of the bar and shafts, means for adjusting said rods longitudinally, and means for adjusting the swinging portion of said shafts laterally.

8. The shafts of a vehicle having a laterally-disposed cross-bar and divided transversely in advance of the cross-bar and with the forward portions swinging laterally relative to the rear portions, members for coupling to the axle and extended into rods having threaded terminals, rods coupled at one end to the shafts and threaded at the other ends reversely to the first-mentioned rods, a turnbuckle member engaging said threaded ends, diagonally-disposed rods connected respectively at one end to said cross-bar and to said shafts in advance of said cross-bar at the other ends, and with the free ends reversely threaded, turnbuckles engaging said threaded ends of said diagonally-disposed rods, and means for clamping said swinging shaft-section in any required position relative to said stationary shaft-section.

9. A vehicle, running-gear having transverse members and longitudinally-disposed members a coupling-plate attached to one of said members and provided with a plurality of spaced teeth in one end, a locking-plate adjustably attached to the same member and with a plurality of spaced teeth for engagement with the teeth of said coupling-plate, rods connected respectively to said running-gear members and extending diagonally between them, and means for adjustably uniting the adjacent ends of said rods for imparting a longitudinal strain thereto.

10. A vehicle running-gear having transverse members and longitudinally-disposed members an integral stay member extending longitudinally of said members and reinforcing the juncture of the same with the terminal of one arm of said stay member provided with a plurality of spaced teeth, a lock-plate attached adjustably to one of said running-gear members and with a plurality of spaced teeth for adjustable engagement with the teeth of said stay member, rods connected respectively to said running-gear members and extending diagonally between them, and means for adjustably uniting the adjacent ends of said rods and imparting longitudinal strain thereto.

In testimony that I claim the foregoing as my own I have hereto affixed my signature in the presence of two witnesses.

FRANKLIN P. WHITE.

Witnesses:
    JOHN W. MOORE,
    ADA L. MOORE.